O. STODDARD.
Bee Hive.
No. 5,714.
Patented Aug. 15, 1848.
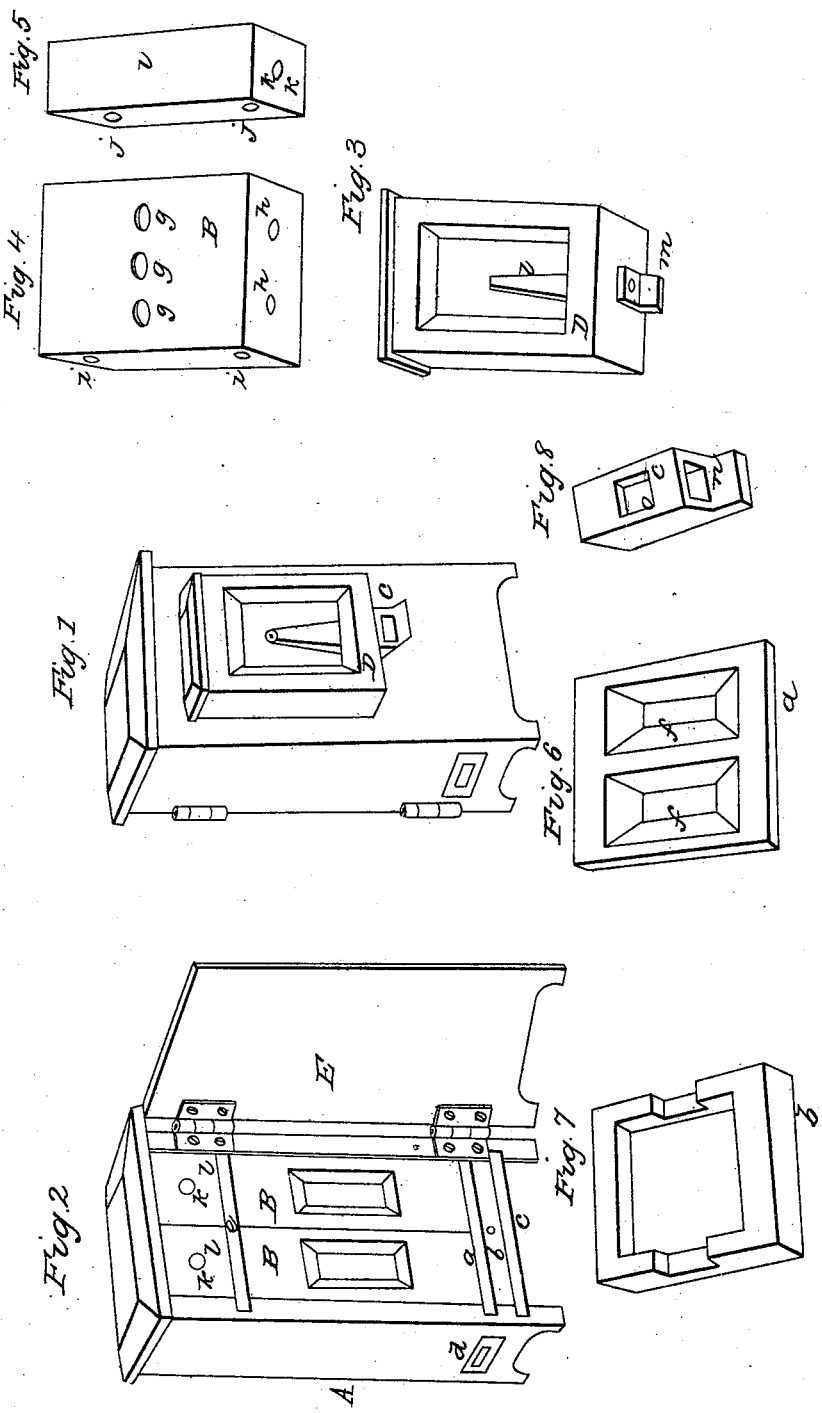

UNITED STATES PATENT OFFICE.

OREN STODDARD, OF BUSTI, NEW YORK.

BEEHIVE.

Specification of Letters Patent No. 5,714, dated August 15, 1848.

*To all whom it may concern:*

Be it known that I, OREN STODDARD, of Busti, in the county of Chautauqua and State of New York, have invented a new and useful Improvement in Beehives for Preventing the Intrusion of Millers and Robbery by Other Bees, called "the Self-Protecting Beehive," and that the following is an exact description thereof, reference being had to the drawings making a part of the same.

Figure 1 represents a perspective view of the hive, when used with the improvement. Fig. 2 a back view of the hive with the door thrown open, so as to exhibit the parts in the condition in which it is ordinarily used. Fig. 3 the trap or instrument which is used to prevent robbery. Fig. 4, a view of one of the apartments or hives, designed for the residence and accommodation of the bees, as the same appears when detached from the casement, and showing the form in which it is constructed. Fig. 5, a view of one of the chambers or boxes, designated a receptacle for the deposit of honey. Fig. 6, a view of the floor on which the apartments or hives are placed. Fig. 7, a view of a drawer, placed below the apartments or hives, to receive dead bees, and other offensive matter that may be in the hives. Fig. 8, a view of the tube, through which the bees pass into and out of the hive.

The letters in the specification refer to similar letters in the drawing.

The hive is composed of the following parts: 1st. The casement A. 2d. The apartments B, B. 3d. The chambers C, C. 4th. The floor of the apartments. *a.* 5th. The drawer *b.* 6th. The trap D. 7th. The tube, *c.*

To enable others skilled in the art, to make and use my invention, I will proceed to describe its construction and operation.

I construct the casement of planed boards, with no entrance into it, except through the tube. Through that, no miller will be allowed to pass. It will be effectually guarded by the bees. On each side of the casement, is an aperture marked, *d*, opening into the drawer below the apartments, designed for the purpose of ventilation. These apertures are protected by wire screens, so tight as effectually to exclude millers. Their size is about one fourth of the breadth of the side of the casement. In front is another aperture, equal in dimensions to both the others, the top of which is on a level with the shelf, *e*, on which the chambers or boxes are placed. This is protected by two wire screens, an inner and outer screen. The back of the casement is a door, E, fastened to the casement with butts or hinges, and when shut is fastened with a hook and staple. Within the casement, are two shelves, *e, e,* one of which, the upper, is designed to support the chambers, and is perforated with holes corresponding with holes in the chambers and in the apartments, to allow the bees to pass from the apartments to the chambers. The lower shelf *e* supports the drawer. Just above the drawer *b*, is the floor, *a*, through which are large apertures *f, f,* into the drawer. The apartments B, B, are made of planed boards, with the exception of a glass window in each outer side next the door. The bottom of the apartments is open standing on the floor, *a*. On the inner side of each of the apartments, are three holes, *g, g, g*, to permit the bees to pass from one to the other, and so formed, that the holes in the side of one stand against those in the other. On the top are two holes *h, h,* corresponding and uniting with holes of the same number and size in the chambers and shelf, *a*, to permit the bees to pass from the apartments to the chambers. On the side, opposite the windows, are also two holes, *i, i,* one corresponding with the tube and the other, with the front aperture in the casement, for the purpose of ventilation. The better to promote ventilation, which I consider very important, in constructing my hives, I place bars across the front of the casement on the inner side, so as to leave a space between the apartments and the front side of the casement.

The chambers C, C, have two holes corresponding with the perforations in the shelf on which they stand. These holes are marked *j, j*, on the drawing, and also correspond with similar holes in the apartments. There is also in the end of each next to the door, a small circular glass window, *k, k.*

The trap D, is also made of planed boards with a glass window in front, nearly as large as the front side. In the center of the bottom of the tray is inserted a long hollow tube *l*, which is the only entrance into it. To this tube is a shank *m*, which being placed in an aperture of the tube to the hive, completely closes the entrance into the hive. The trap is fastened to the front of the casement by hooks or pins, just above the front aperture. (N. B.—The front aperture is not seen in Fig. 1 by reason of its being obscured by the trap.) When the trap is in its place, it entirely prevents the bees within from passing out; and it should be put in its place in the evening or early in the morning, when the hive is in danger of being robbed by strange bees. When in its place, the robbers in attempting to enter the hive, pass into the tube of the hive to the shank, m, of the trap, and instead of entering the hive, as they intend, pass through the tube of the trap, e, into the trap. In their efforts to escape, they will almost invariably make for the window in front, instead of getting out through the tube by which they entered, and will, of course, remain in the trap, during the pleasure of the proprietor. The trap may vary in size. I make it about two thirds of the dimensions of one of the apartments. The tube of the trap, e, stands in the center and extends halfway from the bottom to the top. The aperture at the upper end of this tube is just large enough to permit a bee to pass through it.

The tube, e, is about six inches in length exclusive of the shelf and has in front a shelf, n, about one third of the length of the tube, on which the bees may light. The aperture or entrance of the tube is about three and a half inches wide, and three eighths of an inch high. On the top of the tube is an aperture, o, to receive the trap. The size of the hive may vary with the taste or judgment of the proprietor. I make the casements two and a half feet in height and the sides eighteen inches wide.

The object of having two apartments, is to enable the proprietor to divide the bees working in one casement into two swarms, without the usual process of swarming, which I do by removing one of the apartments, at the time of swarming, or just before, from the casement and replacing it with an empty one, putting the removed apartment by the side of an empty one in another casement.

What I claim as my improvement, and wish to secure by Letters Patent, is—

The manner of preventing robbery by means of the trap.

OREN STODDARD.

Witnesses:
ABNER HAZELTON,
SOLOMON JONES.